W. L. BRANDON.
MILK PAIL.
APPLICATION FILED MAR. 31, 1909.
944,940.
Patented Dec. 28, 1909.
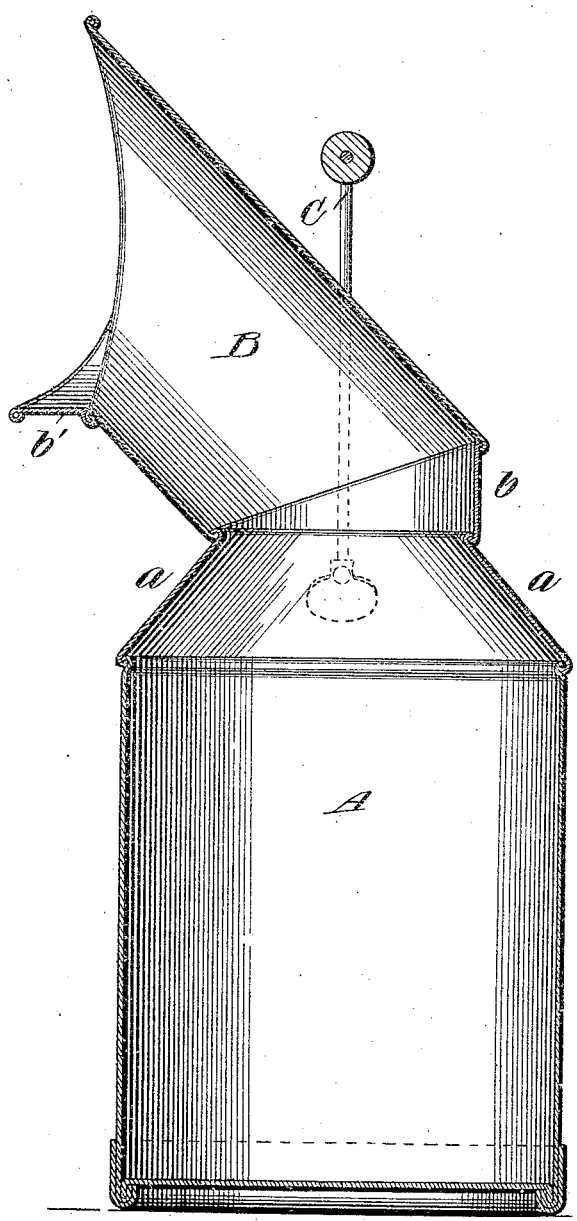
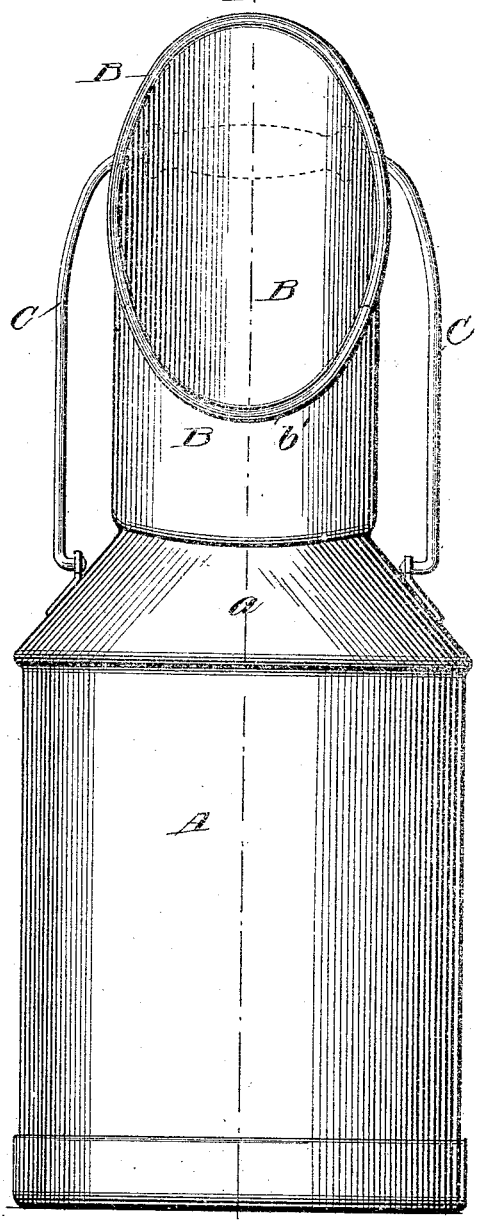
WITNESSES
INVENTOR
WILLIAM L. BRANDON
BY Munn & Co.
ATTORNEYS

UNITED STATES PATENT OFFICE.

WILLIAM LOTHROP BRANDON, OF RENO, NEVADA.

MILK-PAIL.

944,940. Specification of Letters Patent. Patented Dec. 28, 1909.

Application filed March 31, 1909. Serial No. 486,864.

*To all whom it may concern:*

Be it known that I, WILLIAM LOTHROP BRANDON, a citizen of the United States, residing at Reno, in the county of Washoe, State of Nevada, have invented an Improvement in Milk-Pails, of which the following is a specification.

My invention is an improvement in hood-like attachments for milk-pails or buckets, which are designed and adapted to prevent entrance of dirt, hair, or other contaminating substances.

The details of construction, arrangement, and combination of parts are as hereinafter described, and shown in the accompanying drawing, in which—

Figure 1 is a vertical section of a milk-pail or bucket provided with my improved attachment. Fig. 2 is a side elevation of the same.

The body A of the milk-pail or bucket is shown constructed in cylindrical form, and has a top $a$ which is inclined inward and has thus the form of the frustum of a hollow cone.

B indicates the hood-like attachment, which is cylindrical or slightly oval in cross-section, and is placed at an angle of about 45° to the pail A. If the attachment B were secured directly to the top $a$ of the pail, and at the angle shown, it would have to be considerably narrowed in diameter. To avoid this, the attachment is secured to a supplemental piece $b$, which is cylindrical and has the same diameter as the opening in the top $a$ and is inclined on its upper side, as shown in Fig. 1.

In order to enlarge the mouth of the attachment B, a lip $b'$ is attached to the lower side and projects horizontally therefrom. This serves not only to enlarge the mouth and prevent loss of milk in the milking operation, but also as a handle when the pail is reversed for pouring out the milk.

In milking, the pail or bucket is set on the floor or ground, or supported between the legs of the milker, and the attachment B is directed toward the udder of the animal and the milk is discharged from the teats directly into the mouth of the same.

It is apparent that hair, dirt, or other foreign substance cannot drop from the body of the cow into the pail or bucket, but will fall, instead, upon the inclined top portion of the attachment B. It is further apparent that practically the same result is attained with respect to the udder of the animal, owing to the inclination of the attachment B. In brief, the attachment is an effective protector for the pail or bucket, besides being a convenience in the milking operation and in the discharge of the milk from the bucket.

The pail or bucket is provided with a bail-like handle C, the same being attached to the conical top $a$ and adapted to embrace the sides of the attachment B, so that the handle may stand vertical when the bucket is being carried.

What I claim is:

A milk-pail having a cylindrical attachment projecting at a lateral angle and having the lower side of its mouth provided with a horizontal extension $b'$, as and for the purpose specified.

WILLIAM LOTHROP BRANDON.

Witnesses:
CHARLES J. SADLEIR,
KIRTH E. BRANDON.